US012714614B2

(12) United States Patent
Tabor et al.

(10) Patent No.: US 12,714,614 B2
(45) Date of Patent: Aug. 25, 2026

(54) WHEELCHAIR DRIVE APPARATUS AND METHOD

(71) Applicants: Kent A Tabor, Pewaukee, WI (US); Kirk J Noll, Hartland, WI (US); Denis A Pettee, Rotonda West, FL (US)

(72) Inventors: Kent A Tabor, Pewaukee, WI (US); Kirk J Noll, Hartland, WI (US); Denis A Pettee, Rotonda West, FL (US)

( * ) Notice: Subject to any disclaimer, the term of this patent is extended or adjusted under 35 U.S.C. 154(b) by 270 days.

(21) Appl. No.: 18/593,591

(22) Filed: Mar. 1, 2024

(65) Prior Publication Data

US 2024/0293271 A1 Sep. 5, 2024

Related U.S. Application Data

(60) Provisional application No. 63/449,113, filed on Mar. 1, 2023.

(51) Int. Cl.
*A61G 5/04* (2013.01)
*A61G 5/10* (2006.01)

(52) U.S. Cl.
CPC ............. *A61G 5/047* (2013.01); *A61G 5/041* (2013.01); *A61G 5/1054* (2016.11)

(58) Field of Classification Search
CPC ....... A61G 5/041; A61G 5/047; A61G 5/1054
See application file for complete search history.

(56) References Cited

U.S. PATENT DOCUMENTS

| | | | | | |
|---|---|---|---|---|---|
| 3,994,509 | A * | 11/1976 | Schaeffer | A61G 5/023 | 280/243 |
| 4,386,672 | A * | 6/1983 | Coker | A61G 5/047 | 180/907 |
| 5,351,774 | A * | 10/1994 | Okamoto | F16F 1/22 | 267/229 |
| 5,421,598 | A * | 6/1995 | Robertson | A61G 5/1075 | 297/423.26 |
| 5,947,562 | A * | 9/1999 | Christofferson | A61G 5/10 | 297/440.22 |
| 6,257,664 | B1 * | 7/2001 | Chew | A61G 5/12 | 297/354.1 |
| 6,648,354 | B2 * | 11/2003 | James | A61G 5/128 | 280/255 |
| 6,758,291 | B1 * | 7/2004 | Koch | B60D 1/66 | 180/218 |
| 7,311,160 | B2 * | 12/2007 | Lim | A61G 5/02 | 180/9.26 |
| 7,717,447 | B2 * | 5/2010 | Orford | A61G 5/025 | 280/250.1 |
| 9,795,522 | B2 * | 10/2017 | Hansen | A61G 5/0875 | |
| 10,335,331 | B2 * | 7/2019 | Hancock | A61G 5/048 | |

(Continued)

FOREIGN PATENT DOCUMENTS

| | | | | |
|---|---|---|---|---|
| JP | 3819830 B2 * | 9/2006 | A61G 5/047 | |
| WO | WO-2018049269 A1 * | 3/2018 | A61G 5/0825 | |

*Primary Examiner* — Jacob B Meyer

(57) ABSTRACT

A drive apparatus includes a drive assembly and an engagement assembly. The drive assembly includes a motor and a sprocket operatively coupled to the motor. The sprocket defines an engagement hole. The engagement assembly includes an engagement pin and an engagement control member configured to insert the engagement pin into the engagement hole of the sprocket in a first position and withdraw the engagement pin from the engagement hole of the sprocket in a second position.

20 Claims, 11 Drawing Sheets

(56) References Cited

U.S. PATENT DOCUMENTS

| | | | | |
|---|---|---|---|---|
| 10,617,580 | B2 * | 4/2020 | Steiner | A61G 5/1024 |
| 11,291,597 | B2 * | 4/2022 | Pettee | A61G 5/10 |
| 2008/0157581 | A1 * | 7/2008 | Whelan | A61G 5/1067 297/440.2 |
| 2008/0238023 | A1 * | 10/2008 | Bloom | A61G 5/023 280/250.1 |
| 2008/0246246 | A1 * | 10/2008 | Dix | A61G 5/1054 280/233 |
| 2009/0295119 | A1 * | 12/2009 | Bloswich | A61G 5/1024 280/250.1 |
| 2011/0235254 | A1 * | 9/2011 | Uchida | G03G 15/5016 399/81 |
| 2015/0075882 | A1 * | 3/2015 | Tuckowski | B60R 16/0215 180/22 |
| 2019/0046373 | A1 * | 2/2019 | Coulter | A61G 5/1089 |
| 2021/0282986 | A1 * | 9/2021 | Goldish | A61G 5/047 |
| 2024/0293271 | A1 * | 9/2024 | Noll | A61G 5/041 |
| 2024/0293272 | A1 * | 9/2024 | Noll | A61G 5/041 |

* cited by examiner

WHEELCHAIR DRIVE APPARATUS AND METHOD

RELATED APPLICATIONS

This application claims priority to U.S. Patent Application No. 63/449,113, filed on Mar. 1, 2023, entitled "WHEELCHAIR DRIVE APPARATUS AND METHOD", and incorporated herein by reference.

BACKGROUND

Field of the Disclosure

The present disclosure relates generally to motorized vehicles. More particularly, embodiments include a wheelchair drive apparatus and method.

Description of the Related Art

A motorized wheelchair typically propelled by an electric motor which drives and rotates the wheels of the wheelchair. Motorized wheelchairs may be used by individuals unable to propel a manual wheelchair or to traverse a long distance or difficult terrain. Motorized wheelchairs are typically sold commercially as completed units and are generally expensive, which may be cost prohibitive to some individuals that could benefit from the use of a motorized wheelchair.

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

DETAILED DESCRIPTION

Figure 1:
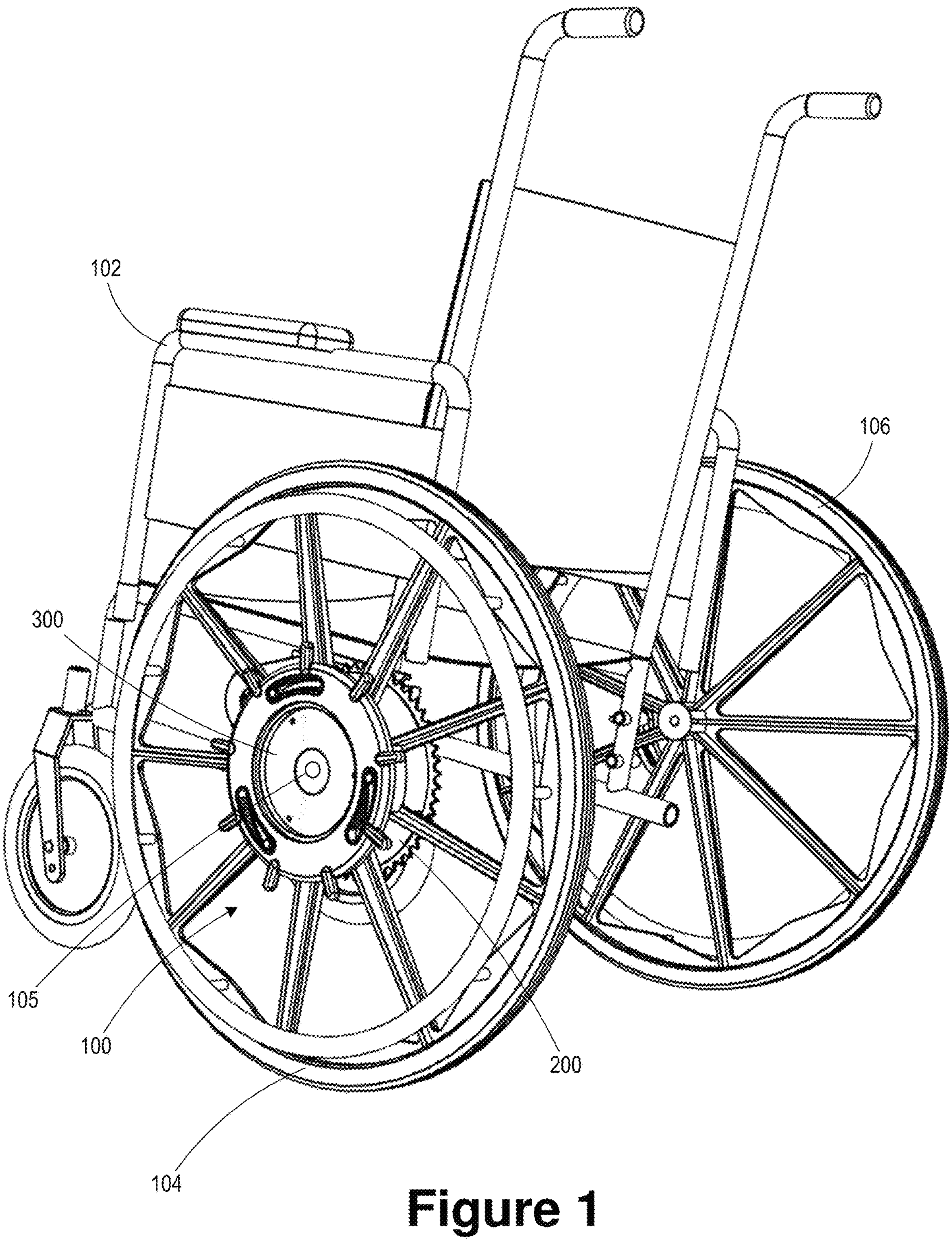
FIG. 1 is a diagram of a wheelchair on which a drive apparatus has been mounted, in accordance with some embodiments.

FIGS. 1, 2A-2E, and 3A-3E illustrate a drive apparatus 100 for mounting to a wheelchair 102, in accordance with some embodiments. In some embodiments, the drive apparatus 100 includes a drive assembly 200 and an engagement assembly 300. The drive assembly 200 provides motive force for moving the wheelchair 102, and the engagement assembly allows the selective engagement or disengagement of the drive assembly 200 from a first wheel 104 of the wheelchair 102, thereby allowing motor driven or manual operation. An axle 105 passes through the engagement assembly 300 and the wheel 104 and mounts to the wheelchair 102 (e.g., using a mounting bracket 230 shown in FIG. 2E). For ease of illustration, only one drive apparatus 100 is illustrated in FIG. 1. A second drive apparatus 100 is mounted to a second wheel 106 of the wheelchair 102.

Referring to FIGS. 2A-2E, the drive assembly 200 includes a motor 202 for driving a first sprocket 204, a chain 206 operatively coupling the first sprocket 204 to a second sprocket 208, a chain guard 210, a mounting bracket 212, and an axle guide 214. The axle guide 214 may be tubular to facilitate passing a wheel axle through the axle guide 214. In some embodiments, a sprocket support plate 216 is mounted to the second sprocket 208, such as by fasteners, to provide increased rigidity. One or more bearings 218 are provided for supporting rotation of the second sprocket 208 with respect to the axle guide 214. In some embodiments, a first bearing 218 is provided on the axle guide 214 for interfacing with the second sprocket 208 and a second bearing 218 is provided on the axle guide 214 for interfacing with the sprocket support plate 216. The first bearing 218 comprises an outer race 218O engaging the second sprocket 208 support plate 216 and an inner race 218I engaging the axle guide 214. The outer race 218O may engage the second sprocket 208 support plate 216 and the inner race 218I may engage the axle guide 214 by interference fit, adhesive, welding, or some other engagement.

According to some embodiments, the mounting bracket 212 includes a first plate 212A interfacing with the second sprocket 208 via the axle guide 214 and a second plate 212B interfacing with the motor 202 and the first sprocket 204. The first plate 212A is laterally movable with respect to the second plate 212B, as represented by the arrow 212T, to allow adjustment of the spacing between the first sprocket 204 and the second sprocket 208 to tension the chain 206. The second plate 212B may have a tab 220 to allow a user to apply a force to laterally move the second plate 212B relative to the first plate 212A. For ease of illustration, the chain 206 is illustrated as a dashed line. Other structures and configurations of the sprockets 204, 208 and the chain 206 are within the scope of the present disclosure. For example, a drive belt or cord may be used in lieu of a chain, and the sprockets 204, 208 may be modified to accommodate the belt or cord. The first plate 212A may be secured to the second plate 212B using one or more fasteners, such as by providing a fastener in an engagement hole 222 to fix the relative positions of the plates 212A, 212B. In some embodiments, a slot 224 is provided in the sprocket 208 and the sprocket support plate 216 to allow the fastener in the engagement hole 222 to be tightened. In some embodiments, a stud 226 extends from the first plate 212A to aid in aligning the drive assembly 200 during mounting to the wheelchair 102. The stud 226 may be threaded to allow a nut to be attached thereto. In some embodiments, the stud 226 is welded to the first plate 212A. The axle guide 214 passes through a mounting hole defined in the first plate 212A. In some embodiments, the mounting hole in the first plate 212A is smaller than the axle guide 214 to provide an interference fit or the axle guide 214 is welded or mounted to the first plate 212A.

Figure 2A:
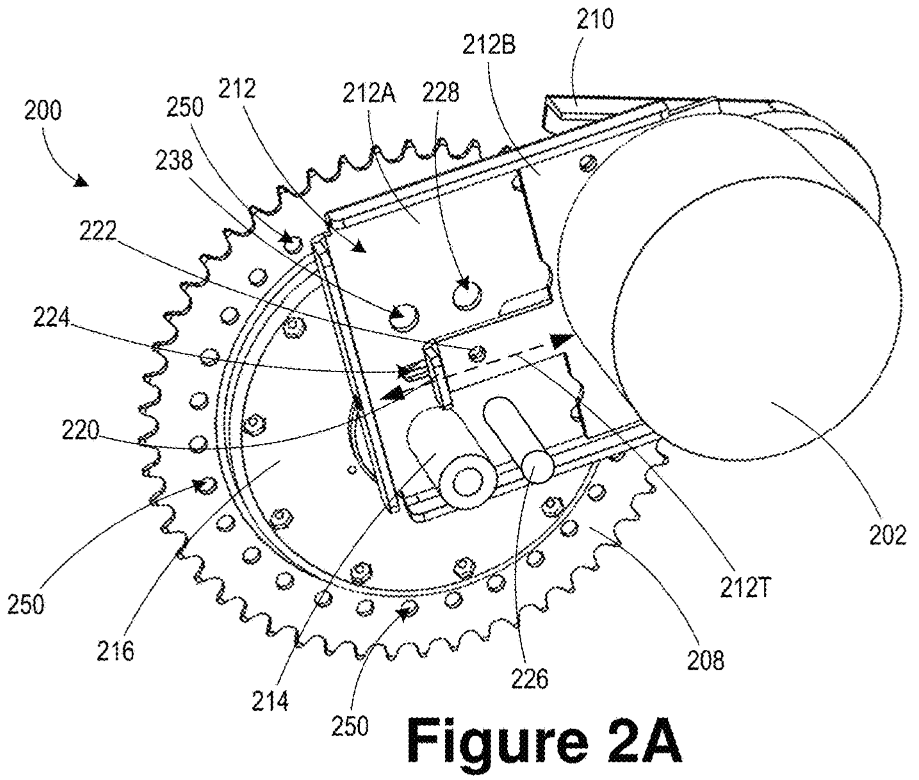
FIGS. 2A-2E are diagrams of a drive assembly, in accordance with some embodiments.
Figure 2B:
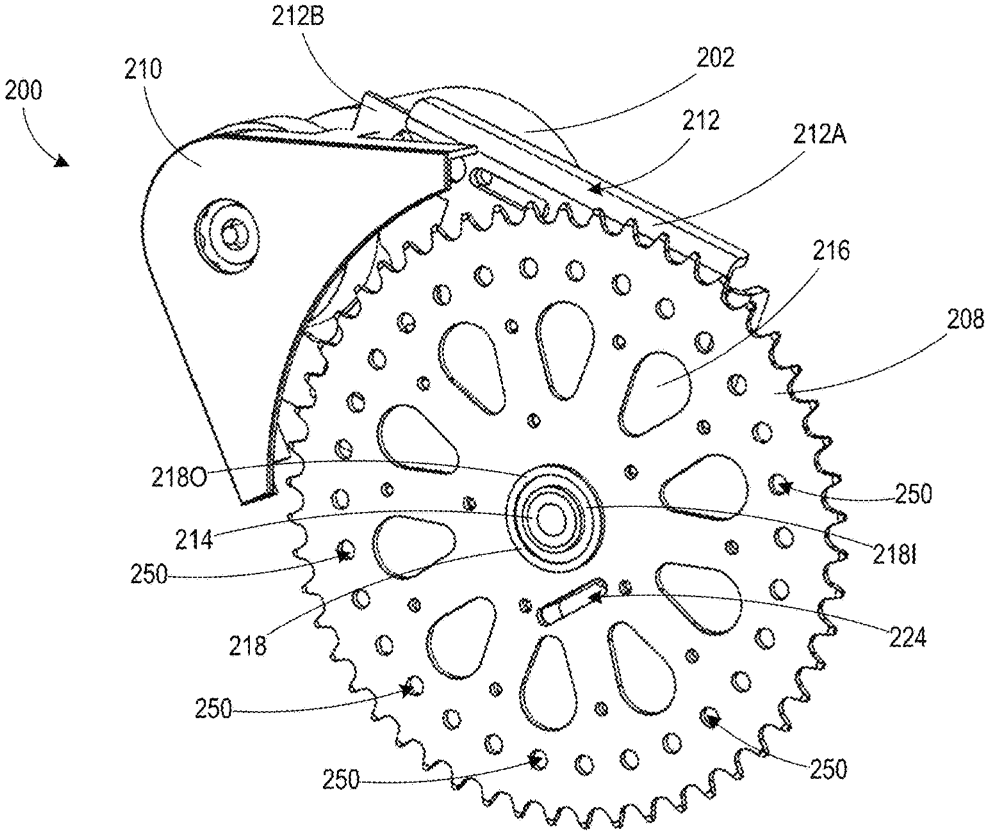
Figure 2C:
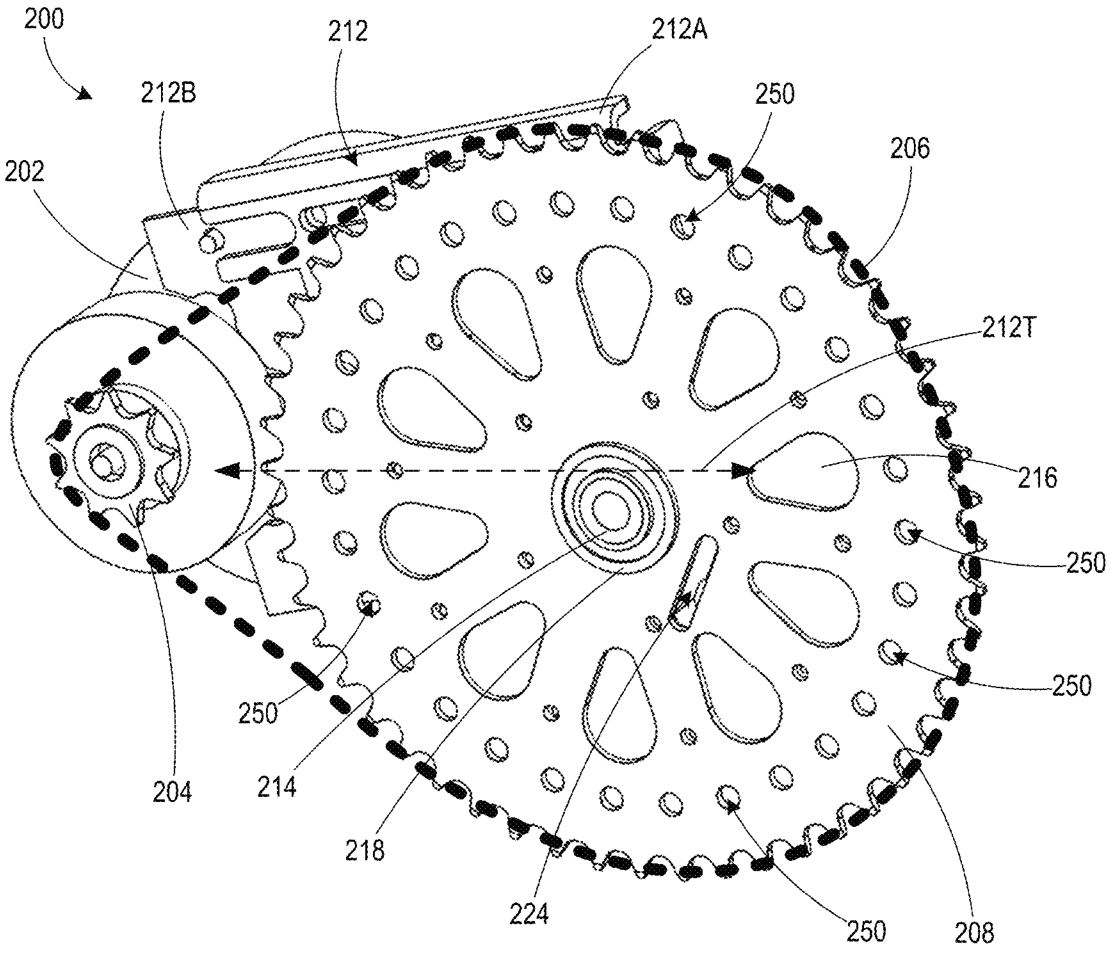
Figure 2D:
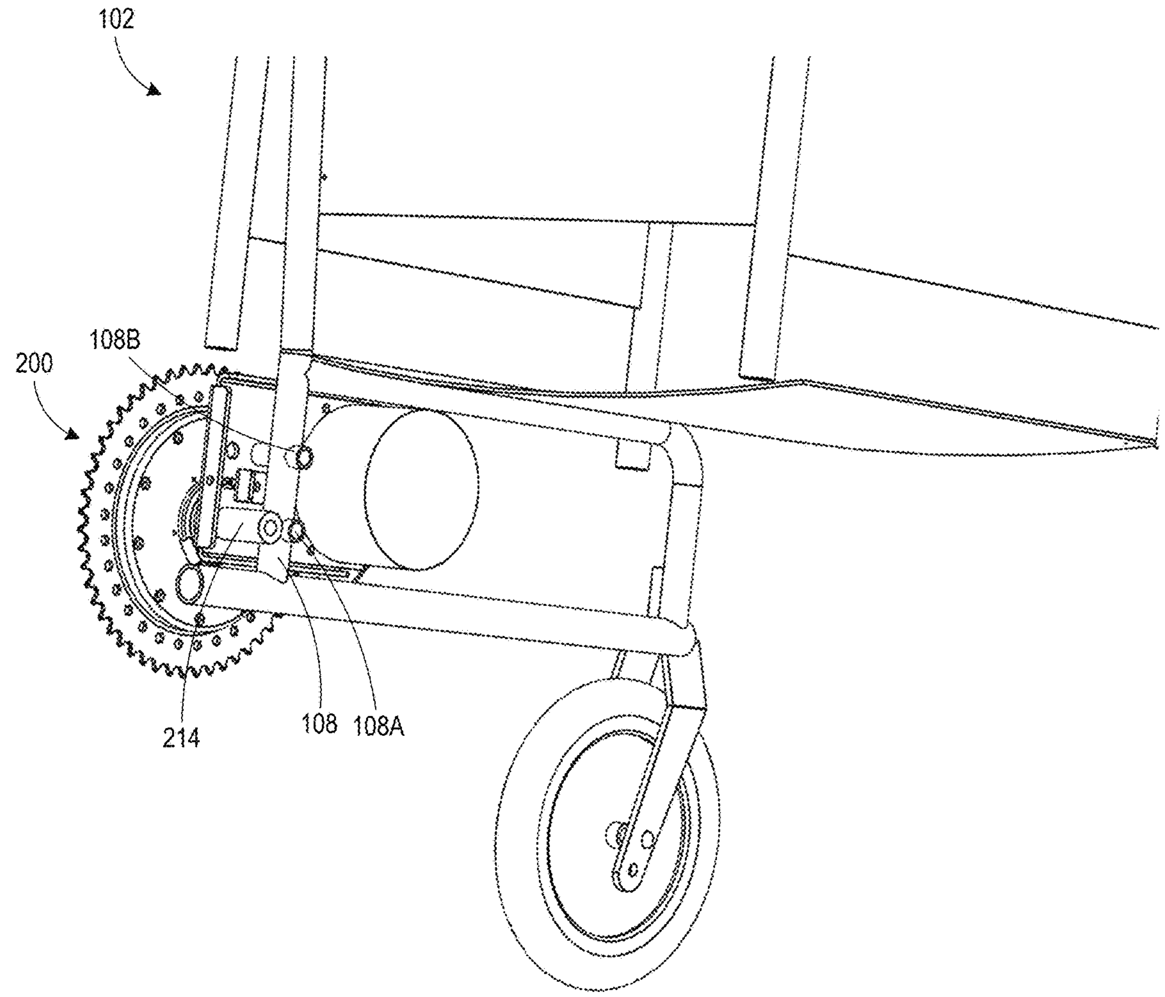

Referring to FIG. 2D, the drive assembly 200 is mounted to a frame 108 of the wheelchair 102. In some embodiments, the frame 108 includes axle mounts, such as a first axle tube 108A and a second axle tube 108B. In a conventional wheelchair, the wheel 104 is passed through a selected one of the axle tubes 108A, 108B depending on the diameter of the wheel 104. The spacing between the axle tubes 108A, 108B may be about two inches, which is the standard spacing for axle mounts in the frame 108 of the wheelchair 102. For example, a smaller diameter wheel 104 may be employed for a child or smaller adult. The drive assembly 200 is mounted by passing the stud 226 through the second axle tube 108B in the frame 108 and providing a fastener, such the fastener 512 illustrated in FIG. 5E, that extends through a mounting hole 228 defined in the first plate 212A and through the first axle tube 108A of the frame 108. In some embodiments, the relative positions of the stud 226 and the fastener may be reversed, or the stud 226 may be omitted and two fasteners may be used, or two studs 226 may be used.

Figure 2E:
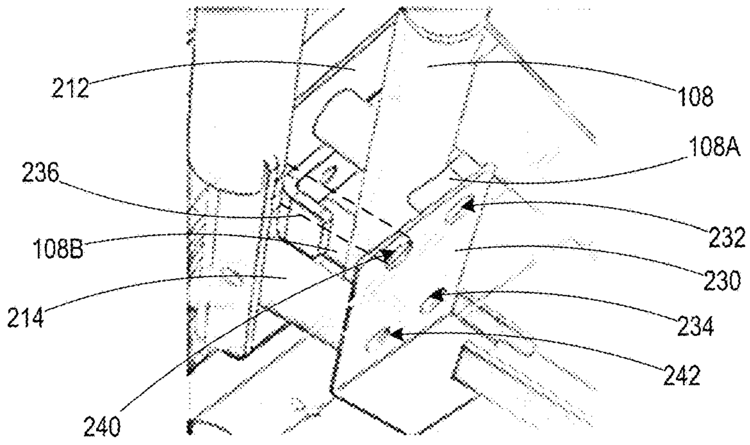

Referring to FIG. 2E, a mounting bracket 230 provides a support frame that interfaces with the mounting bracket 212 to secure the drive assembly 200 to the frame 108. The fastener and the stud 226 pass through mounting holes 232, 234 defined in the mounting bracket 230 and nuts may be attached to the fastener and/or the stud 226 to secure the drive assembly 200. In some embodiments, a support 236 (show in phantom), such as a spacer, is provided between the mounting brackets 212, 230 and a fastener, such as the fastener 510 illustrated in FIG. 5E, passes through a mounting hole 238 defined in the first plate 212A of the mounting bracket 212 and through an axle hole 240 defined in the mounting bracket 230. In some embodiments, a stud is mounted to the first plate 212A in the position where the mounting hole 238 is illustrated and the stud passes through the axle hole 240 of the mounting bracket 230. A mounting hole 242 aligned with the axle guide 214 is defined in the mounting bracket 230 through which the axle 105 may be passed at a later stage of the assembly process. A nut may be placed on the axle 105 to secure the axle to the mounting bracket 230, similar to the nut 518 attached to the motor axle in FIG. 5E.

According to some embodiments, the mounting hole 228 in the first plate 212A of the mounting bracket 212 and the stud 226 are vertically offset and align with the axle tubes 108A, 108B in the frame 108 of the wheelchair 102 and the mounting holes 232, 234 in the mounting bracket 230. The axle guide 214 and corresponding mounting hole 242 in the mounting bracket 230 are laterally offset from the axle tube 108B. The mounting hole 238 in the first plate 212A of the mounting bracket 212 and the axle hole 240 in the mounting bracket 230 are laterally offset from the axle tube 108A. The mounting brackets 212, 230 allow mounting of the drive assembly 200 to virtually any wheelchair, since the positioning of the axle tubes 108A, 108B in the frame 108 of the wheelchair are typically uniform across manufacturers. The lateral offset between the axle guide 214 shifts the center of gravity of the drive apparatus 100 toward the rear of the wheelchair 102, thereby improving the stability of the wheelchair 102.

According to some embodiments, the mounting bracket 230 extends from a battery support frame that holds rechargeable batteries for powering the motor 202.

Referring to FIGS. 3A-3E, the engagement assembly 300 includes an engagement control member 302, a first retaining plate 304, wedges 306A mounted to the first retaining plate 304 (e.g., using screws, adhesive, or some other bonding mechanism), and engagement pins 308. The engagement control member 302 rotates relative to the first retaining plate 304 to move the engagement pins laterally. In some embodiments, the engagement control member 302 comprises a wheel rotatable to extend or retract the engagement pins 308. The engagement pins 308 each include a head 308H and a shaft 308S. In some embodiments, ramps 310 define an inclined plane that engages the heads 308H of the engagement pins 308 such that rotation of the engagement assembly 300 changes the positions of the engagement pins 308 along the ramps 310 and thereby changes the amount of lateral extension of the shafts 308S toward engagement holes 250 defined in the sprocket 208 to engage or disengage the sprocket 208. The engagement pins 308 may be spring biased. In the close-up view of FIG. 3C, the engagement pin 308 is in the withdrawn position at the highest point of the ramp 310. The position 312 indicated in phantom, represents the engaged position of the engagement pin 308 at the lowest point of the ramp 310. In some embodiments, the ramps 310 are inserts that engage slots 314 in the engagement control member 302. This arrangement allows the ramps 310 to be reversed in sense between the wheels 104, 106, such that rotation of the engagement control members 302 for each wheel 104, 106 in one direction (e.g., forward or backward) engages the drive assembly 200 and rotation of the engagement control members 302 for each wheel 104, 106 in the opposite direction disengages the drive assembly 200.

Figure 3A:
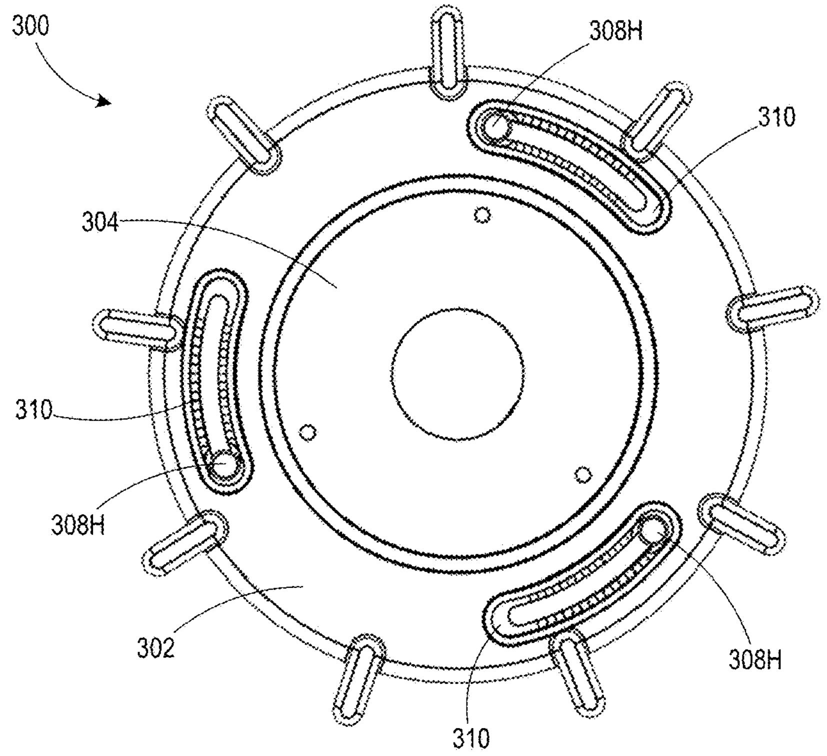
FIGS. 3A-3F are diagrams of an engagement assembly, in accordance with some embodiments.
Figure 3B:
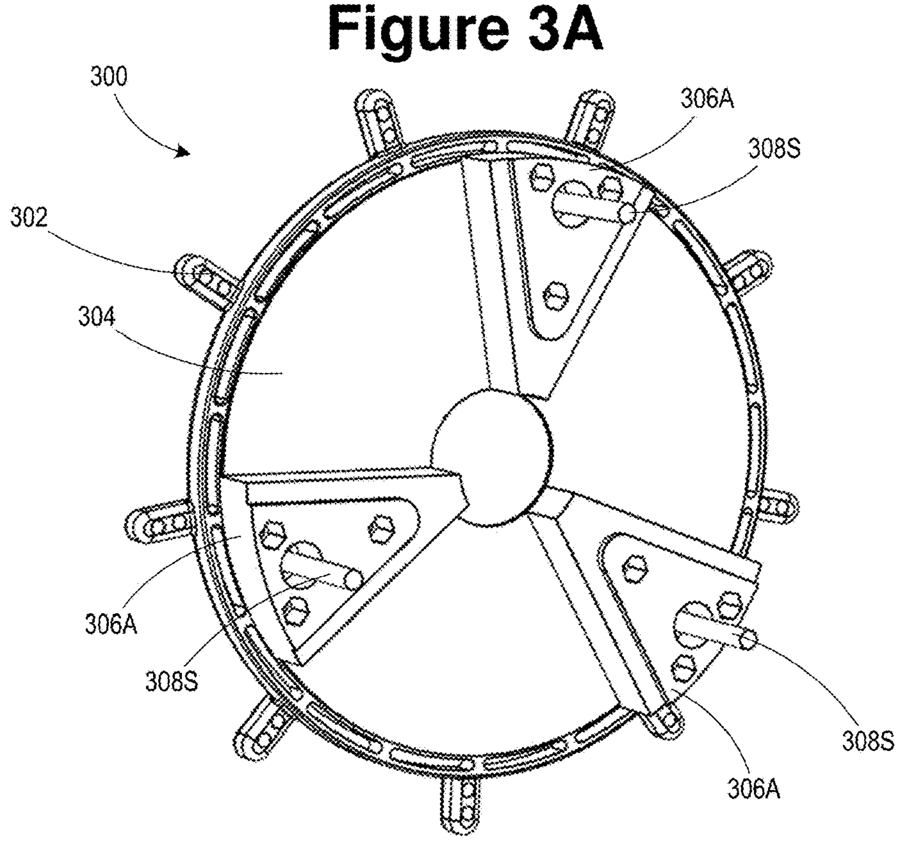
Figure 3C:
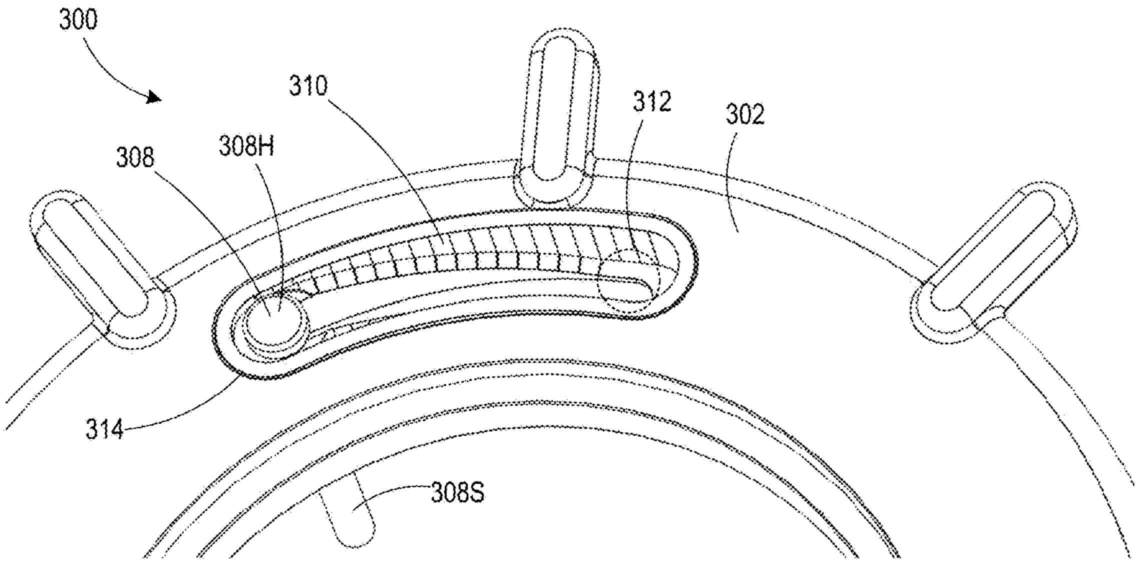
Figure 3D:
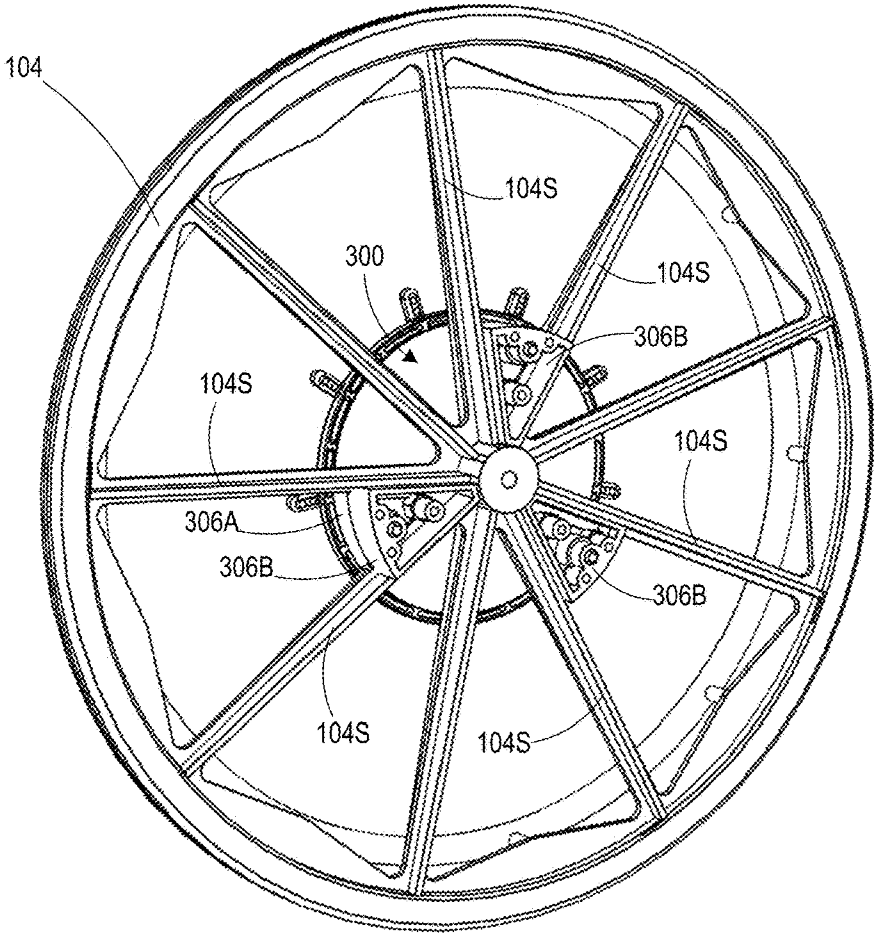
Figure 3E:
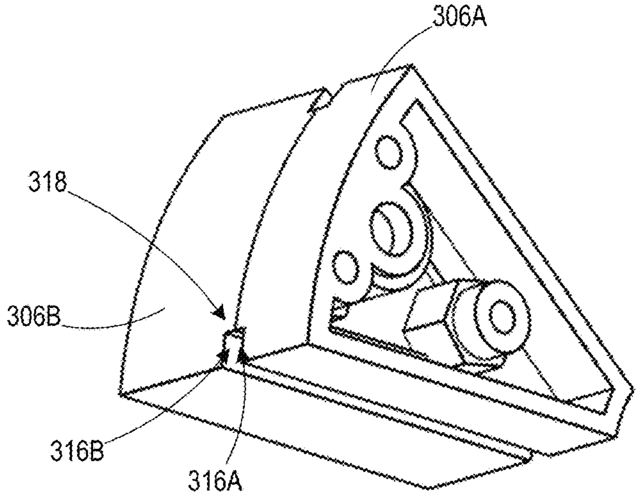

Referring to FIG. 3D, the engagement control member 302 and wedges 306A are placed in engagement with spokes 104S of the wheel 104 and wedges 306B are interfaced with the wedges 306A. Referring to FIG. 3E, the wedge 306A defines a notch 316A and the wedge 306B defines a notch 316B, that collectively define a channel 318 that interfaces with the spoke 104S of the wheel 104. In some embodiments, the configuration of the notches 316A, 316B and the channel 318 vary depending on the geometry of the spoke 104S.

Figure 3F:
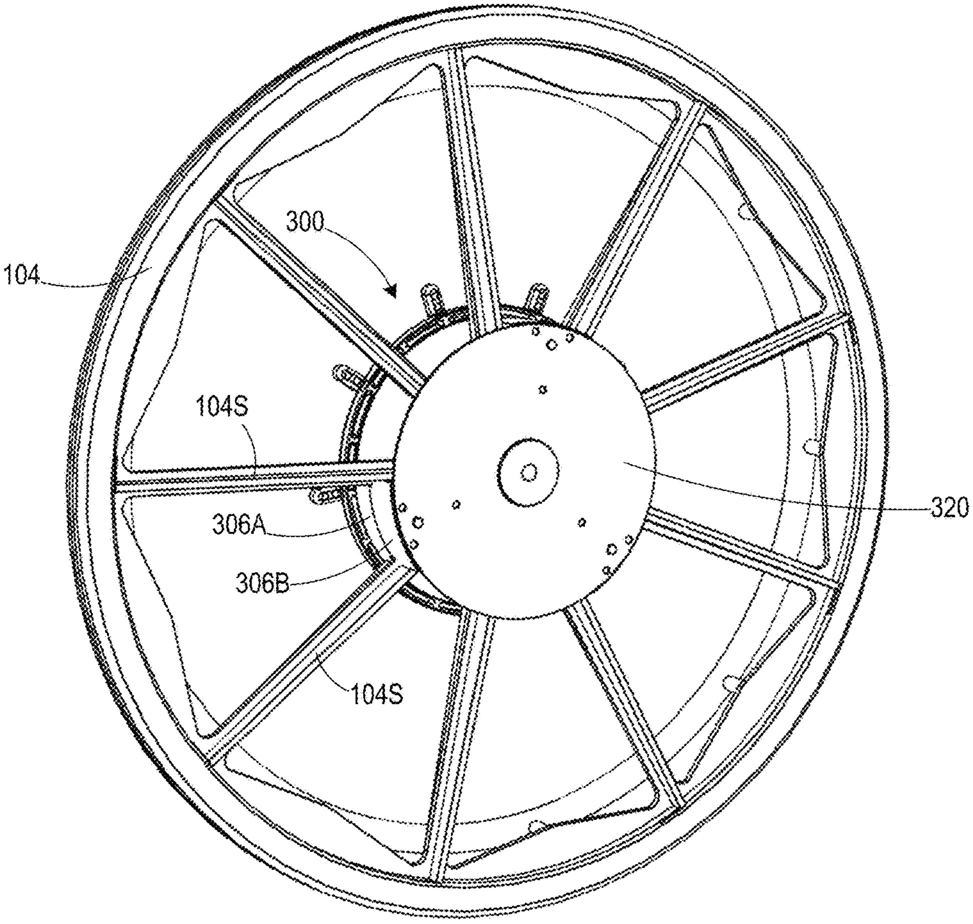

Referring to FIG. 3F, a second retaining plate 320 is attached to the wedges 306B to complete the mounting of the engagement assembly 300 to the wheel 104. In some embodiments, fasteners are preloaded in the wedges 306A, and the fasteners extend through the wedges 306B and the second retaining plate 320 to allow easy positioning of the wedges 306B and the second retaining plate 320. Referring to FIGS. 1 and 2D, the engagement assembly 300 and the wheel 104 are mounted to the frame 108 by passing an axle through the axle guide 214 and securing a fastener to the axle.

To engage the drive apparatus 100 in a drive mode and allow motorized operation of the wheelchair 102, a user rotates the engagement control member 302 to the inserted position and the engagement pins 308 engage the engagement holes 250 defined in the sprocket 208. To disengage the drive apparatus 100 in a freewheeling mode and allow manual operation of the wheelchair 102, the user rotates the engagement control member 302 to the withdrawn position and the engagement pins 308 disengage engagement holes 250 defined in the sprocket 208 to allow the wheel 104 to freely rotate.

Figure 4:
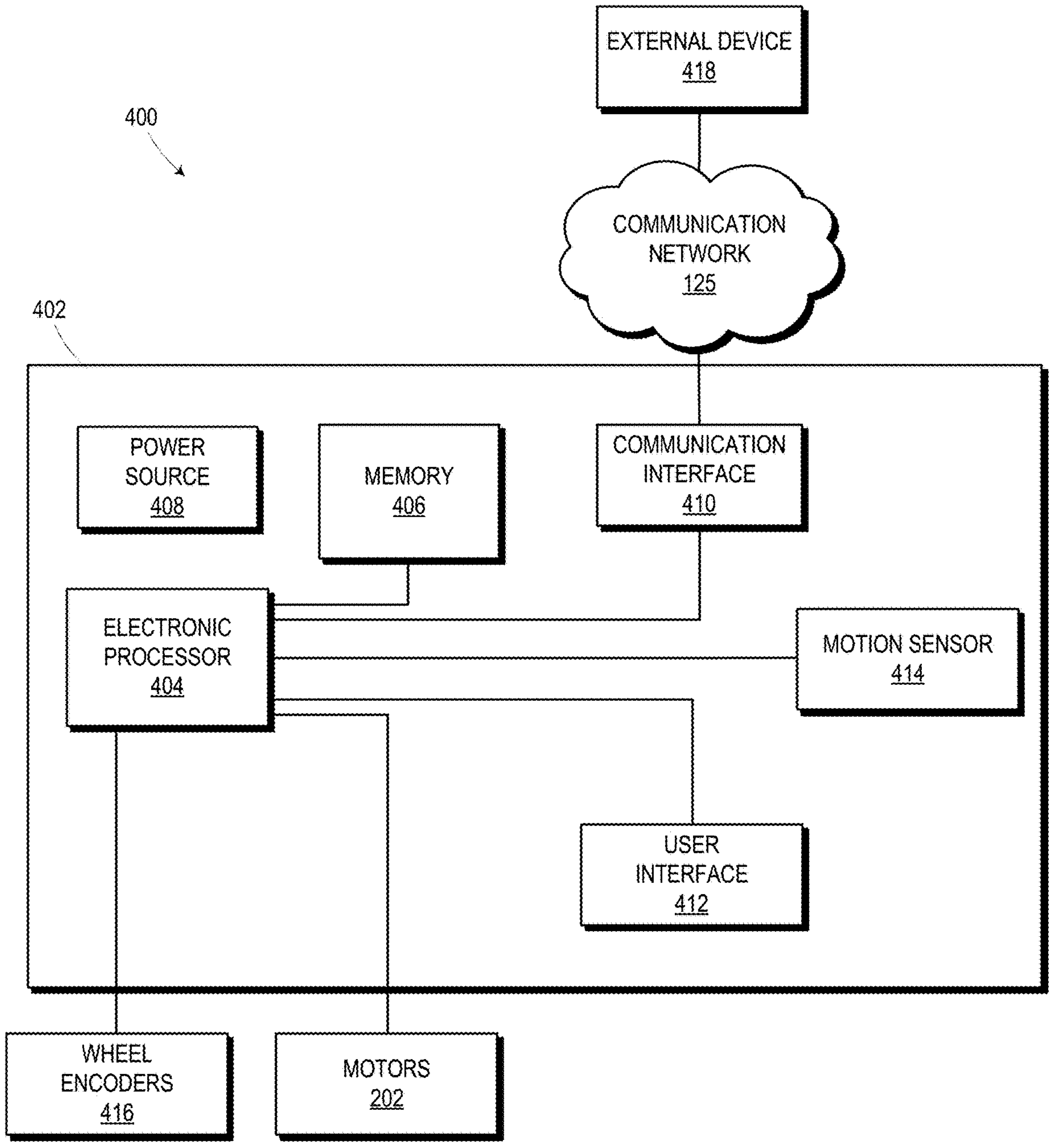
FIG. 4 is a block diagram of a control unit for operating the wheelchair, in accordance with some embodiments.

FIG. 4 is a block diagram of a control unit 400 for controlling the motors 202 for operating the wheelchair 102, according to some embodiments. The control unit 400 may contain a housing 402. As illustrated in FIG. 4, the control unit 400 includes an electronic processor 404, a memory 406, a power source 408, a communication interface 410, a user interface 412, and a motion sensor 414. The control unit 400 may interface with external sensors, such as wheel encoders 416. It should be appreciated that control unit 400 may include any of numerous other types of sensors in addition to or instead of the above-described sensors.

The memory 406 includes read only memory (ROM), random access memory (RAM), other non-transitory computer-readable media, or a combination thereof. The electronic processor 404 is configured to communicate with the memory 406 to store data and retrieve stored data. The electronic processor 404 is configured to receive instructions and data from the memory 406 and execute, among other things, the instructions. In particular, the electronic processor 404 executes instructions stored in the memory 406 to perform the methods described herein.

The power source 408 provides power to the various components of the control unit 400. In some embodiments, the power source 408 includes a rechargeable device, such as a battery, a capacitor, a super capacitor, or the like. The power source 408 may charge rechargeable device using inductive charging or energy harvesting. In some embodiments, the power source 408 includes a replaceable battery. The power source 408 may be the battery used to provide power to the motors 202, and thus, may be external to the housing 402.

In some embodiments, the motion sensor 414 includes an accelerometer, magnetometer, mercury switch, gyroscope, compass, pressure sensor, or some combination thereof. In some embodiments, the motion sensor 414 is an inertial measurement unit (IMU).

The communication interface 410 allows for communication between the electronic processor 404 and an external device 418, such as a smartphone, a tablet, a cloud computing resource, or some other external device. In some embodiments, the communication interface 410 may include separate transmitting and receiving components. In some embodiments, the communication interface 410 supports one or more wireless protocols, such as WI-FI™, BLUETOOTH™, cellular, or some other wireless protocol.

In some embodiments, the user interface 412 includes one or more of a joystick, input buttons, a display, a visual indicator (e.g., LED light), a vibration indicator, an audible indicator, or the like. In some embodiments, the housing 402 comprises the housing of the user interface 412, whereby the control unit 400 is housed in the user interface 412.

The electronic processor 404 receives an input signal from the user interface and generates drive signals for the motors 202 to move the wheelchair. In some embodiments, wheel encoders 416 are provided on the wheel 104. The wheel encoders 416 generate a pulse signal that the electronic processor 404 uses to track wheel movement. In some embodiments, the electronic processor 404 receives feedback from the motors 202 to estimate speed using a motor back-EMF measurement. In some embodiments, the motion sensor 414 provides a feedback signal to the electronic processor 404 regarding motion of the wheelchair 102. Thus, the electronic processor 404 receives one or more feedback signals related to motion of the wheelchair 102, such as encoder feedback, motor feedback, motion feedback, or some other feedback signal and controls the drive signals provided to the motors 202. In some embodiments, the motor drive signals are pulse width modulation (PWM) signals.

The electronic processor 404 implements a primary control loop for controlling the motors 202. In an embodiment, where the user interface 412, is a joystick, the electronic processor 404 receives a command vector that includes a direction and a magnitude. The user controls speed by selecting how far the joystick is moved in the desired direction. Based on the command vector, the electronic processor 404 generates drive signals for each motor 202, such as a command speed for each motor 202. The primary control loop may include secondary control loops for each wheel 104 that receive the command speed and adjust the wheel drive signals based on feedback. The motion sensor 414 may provide feedback to the primary control loop, since the motion data is not wheel dependent. The wheel encoders 416 and the motors 202 provide feedback to the secondary control loop for the associated wheel 104. If the feedback motion vector differs from the command vector by an amount less than a fault threshold, the primary control loop adjusts the drive signals to the motors 202 to reduce the error. For example, if the wheelchair 102 is on a banked or inclined surface, the feedback motion vector may differ from the command vector.

In some embodiments, the electronic processor 404 implements safety measures to attempt to identify discrepancies between the input from the user interface 412, the command vector, and the actual motion of the wheelchair 102. In some embodiments, the electronic processor 404 compares the motion feedback from the motion sensor 414 to the feedback from the wheel encoders 416 and the motors 202. The electronic processor 404 may use a majority voting technique that ignores the one of the three signals that is inconsistent and issues a warning, such as an indicator light or audible warning on the user interface 412. In some embodiments, if an inconsistent motion signal is received, the electronic processor 404 transitions to a creep mode, where the speed of the wheelchair 102 is significantly limited. For example, if the motors 202 both provide feedback indicating they are moving forward, but the feedback from the wheel encoders 416 indicates that only one wheel 104 is moving, and motion sensor 414 provides a signal that the wheelchair 102 is pulling to one side, the electronic processor 404 may generate a fault condition indicating that a motor 202 is slipping, disengaged, or stuck or the gear train has failed. In some embodiments, the electronic processor 404 displays an alert message on the user interface 412 or sends a message to the external device 418.

In some embodiments, the electronic processor 404 monitors the signals from the wheel encoders 416 to identify situations that require corrective action or limits on the motion of the wheelchair 102. For example, if no drive signal is applied to the motors 202 and the wheel encoders 416 or the motion sensor 414 detect forward or reverse motion, the wheelchair 102 may be on an inclined surface and to prevent creep, the electronic processor 404 applies a drive signal to compensate for the motion.

In some embodiments, the electronic processor 404 employs data from the motion sensor 414 to identify if the wheelchair 102 is tipping or moving over rough terrain. If tipping is detected, based on z-axis motion for example, a compensating signal may be applied by the electronic processor 404 in a direction to reverse the tipping. In the case of rough terrain, evidenced by spikes in the acceleration vectors, the electronic processor 404 may reduce the command speed.

The electronic processor 404 may apply limits to changes in the drive signal depending on the movement state. For example, data from the wheel encoders 416 may indicate wheel slippage and may be used for traction control. In some embodiments, the electronic processor 404 applies a limit to restrict left or right motion as the forward or backward speed increases to reduce the likelihood of tipping the wheelchair 102. The limit is more restrictive as the speed increases.

In some embodiments, where the user interface 412 is a joystick, sense resistors are added to the high and low sides of the potentiometers on the joystick. These resistors allow the electronic processor 404 to determine if a wire has been broken or a joystick potentiometer is faulty or intermittent and to determine the joystick position based on the sensed voltages. In some embodiments, the electronic processor 404 monitors for centering of the joystick prior to impending a drive signal. The electronic processor 404 may monitor for dither in the joystick signal resulting from slight movements of a user's hand, since a user cannot keep their hand perfectly still except when the joystick is moved to an extreme position. Responsive to the dithering being absent in the joystick signal, the electronic processor 404 indicates a potential joystick fault and may provide an indication on the user interface 412 or send a message to the external device 418.

Referring to FIG. 5A-5G, diagrams of a mounting bracket 500 are provided, according to some embodiments. The mounting bracket 500 includes a first plate 502 interfacing with a second plate 504 and a support frame 506. The first plate 502 defines mounting holes 502A, 502B, 502C and a keyed axle hole 502K with a key including at least one of a tab 502T or a flat edge 502F. The mounting holes 502A, 502B are vertically aligned and may be spaced about 2 inches apart to match the standard orientation of the axle mounts provided by the axle tubes 108A, 108B in the frame 108. The second plate 504 defines mounting holes 504A, 504B aligned with the mounting holes 502A, 502B. The support frame 506 defines mounting holes 506C1 and 506C2 aligned with the mounting hole 502C and axle holes 506K1, 506K2 aligned with the keyed axle hole 502K. In some embodiments, the support frame 506 comprises a square tube. In some embodiments, the support frame 506 comprises a U-shaped channel where the open end of the channel faces the first plate 502. In some embodiments, at least one of the axle holes 506K1, 506K2 is also keyed with at least one of the tab 502 or the flat edge 502F in a pattern to match the keyed axle hole 502K. The first plate 502 with the keyed axle hole 502K and the support frame 506 with the axle holes 506K1, 506K2 define an axle guide 500G in the mounting bracket 500.

The second plate 504 defines one or more mounting holes 504D aligned with corresponding mounting holes 506D in the support frame 506. The second plate 504 is secured to the support frame 506 using one or more fasteners 508 that pass through the mounting holes 504D, 506D. In some embodiments, the second plate 504 comprises a first member 504E perpendicular to the first plate 502 and a second member 504F. In some embodiments, the second member 504F is parallel to the first plate 502 and approximately perpendicular to the first member 504E. The support frame 506 supports the first plate 502 and the second plate 504 to avoid rotational movement or deflection thereof.

Figure 5A:
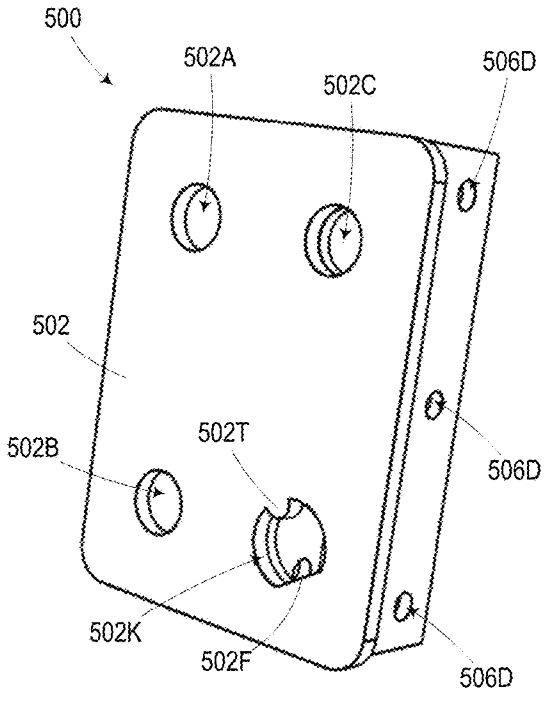
FIGS. 5A-5G are diagrams of an engagement assembly, in accordance with some embodiments.
Figure 5B:
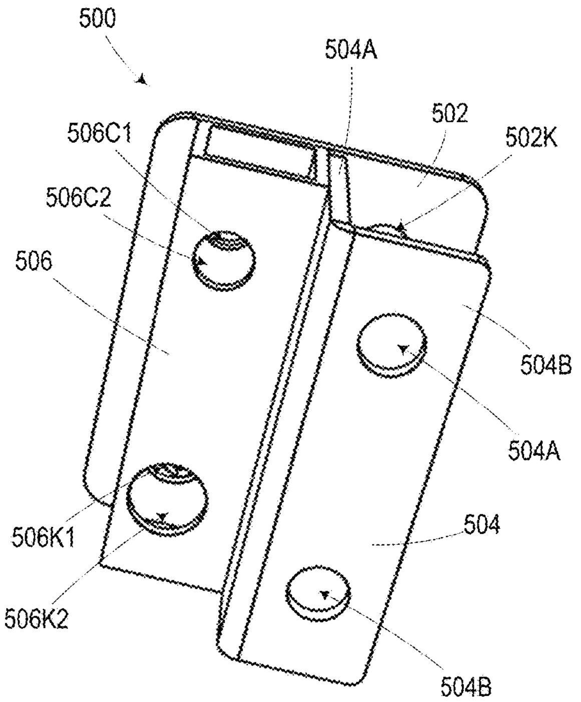
Figure 5C:
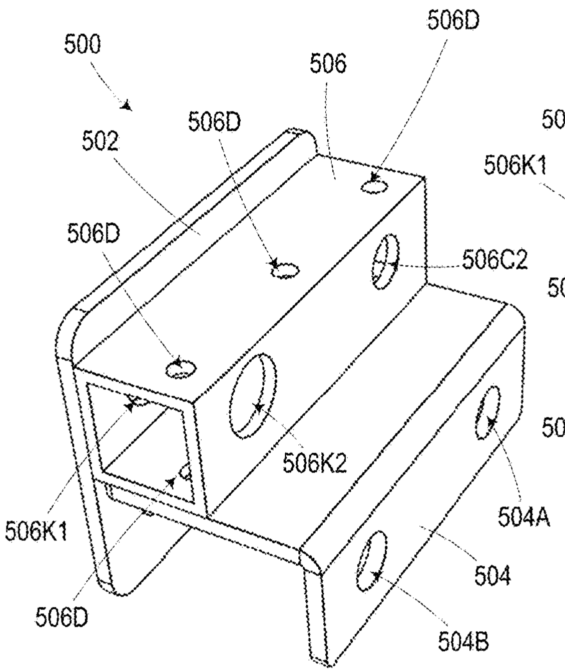
Figure 5D:
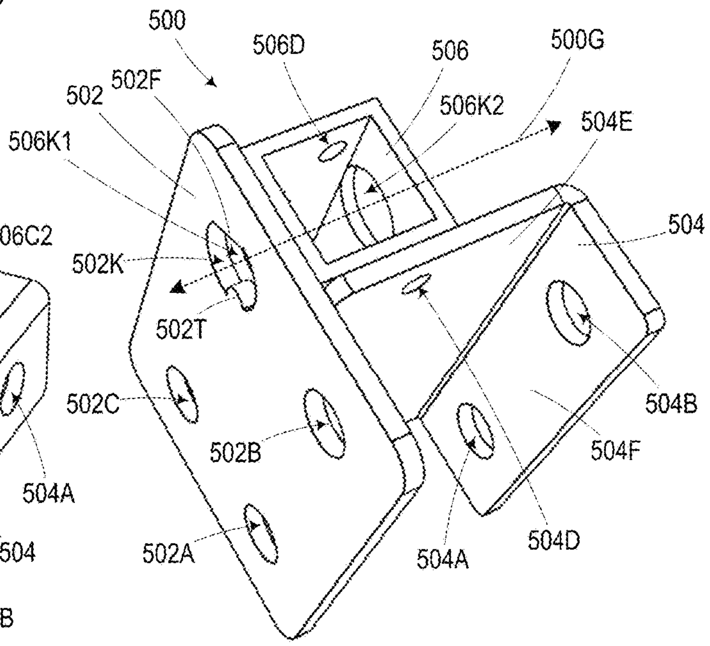
Figure 5E:
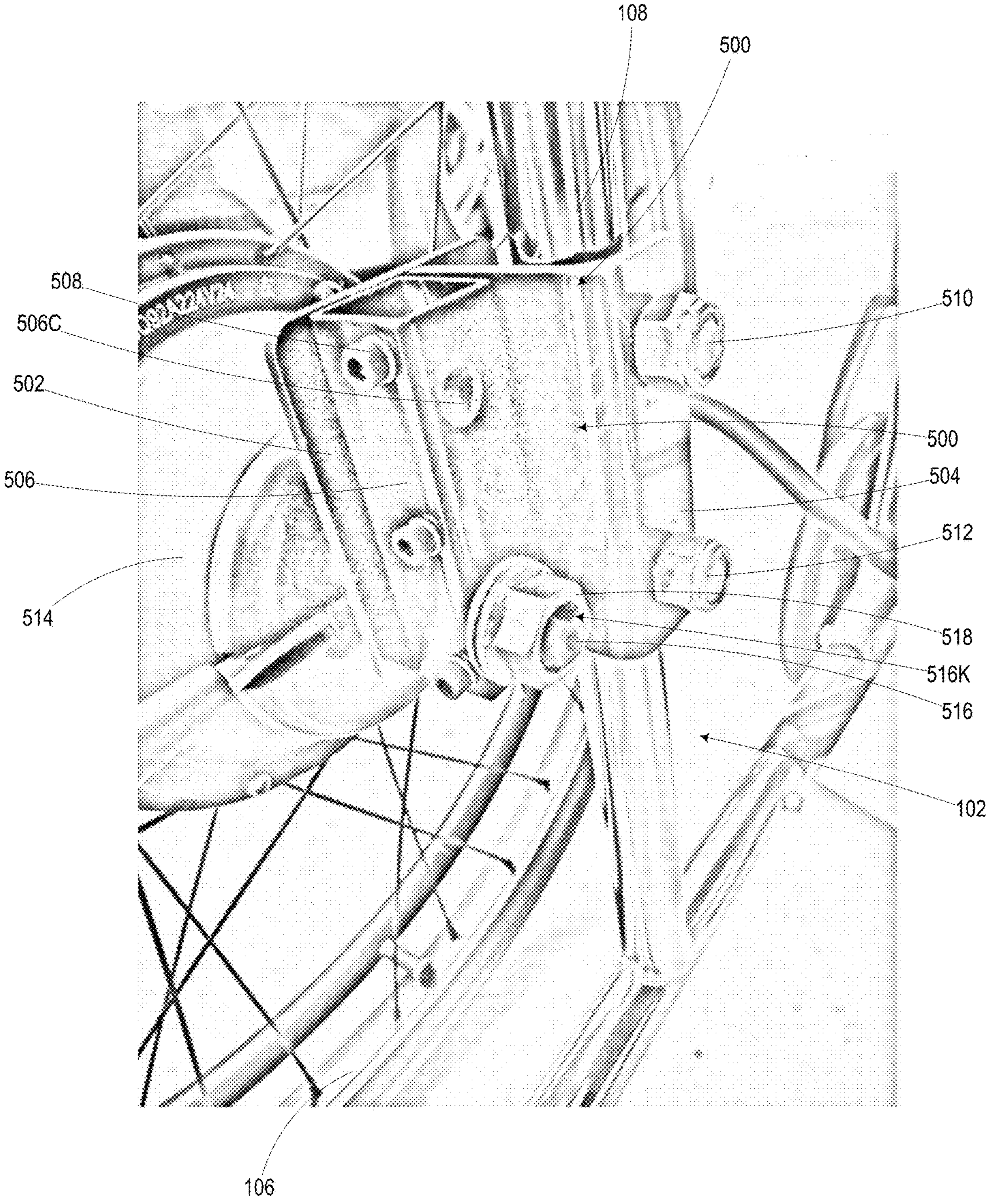
Figure 5F:
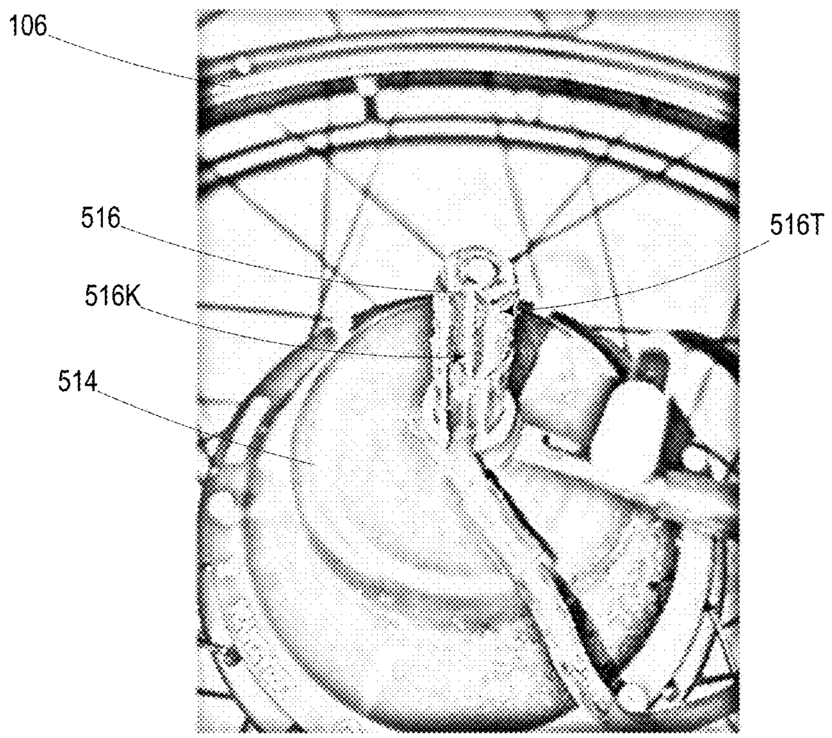

Referring to FIG. 5E, the mounting bracket 500 is mounted to the frame 108 of the wheelchair 102, such as through the first axle tube 108A and the second axle tube 108B illustrated in FIG. 2D. The mounting holes 502A, 504A are vertically offset from the mounting holes 502B, 504B, and the keyed axle hole axle hole 502K is laterally offset from the mounting holes 502A, 502B. The mounting bracket 500 is mounted by passing a fastener 510 through the mounting hole 502A, the second axle tube 108B, and the mounting hole 504A and by passing a fastener 512 through the mounting hole 502B, the first axle tube 108A, and the mounting hole 504B. Although not illustrated, an additional fastener may be provided through the mounting hole 502C and the mounting hole 504C.

Figure 5G:
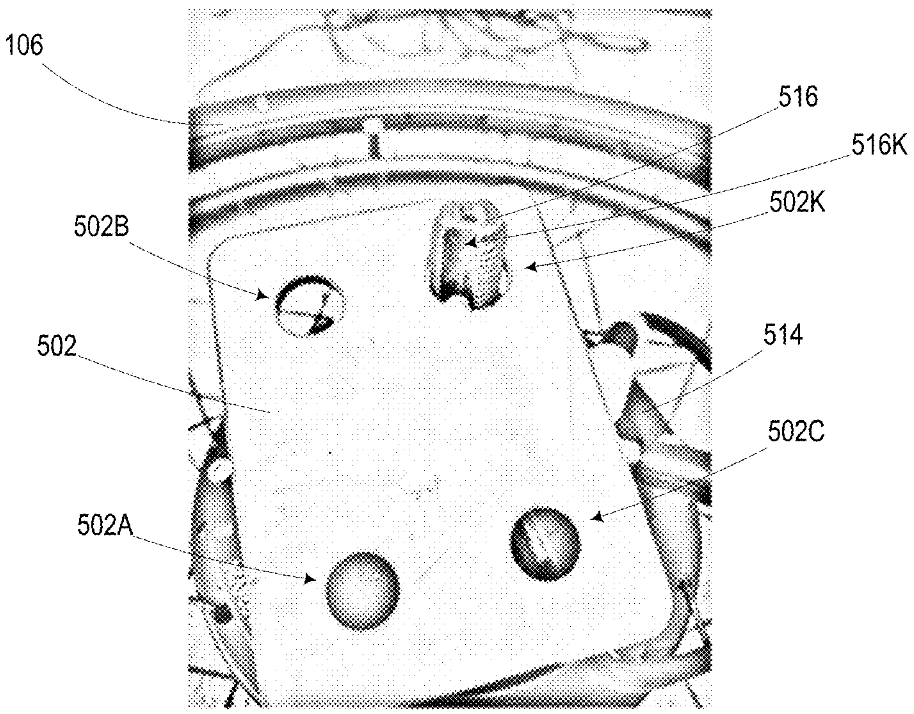

Referring to FIG. 5G, a motor 514 is mounted to the wheel 106 of the wheelchair 102. A motor axle 516, which is the rotor of the motor 514, extends from the motor 514 and a keyed groove 516K is defined in the motor axle 516. The wheel 106 is mounted to the wheelchair 102 by passing the motor axle 516 through the keyed axle hole 502K and through the axle holes 506K1, 506K2. The keyed groove 516K is an inverse of the pattern of the keyed axle hole 502K to prevent rotation of the motor axle 516 relative to the mounting bracket 500 and the frame 108. Thus, force generated by the motor 514 rotates the wheel 106. In some embodiments, the motor axle 516 defines a threaded end portion 516T, and a nut 518 secures the motor axle 516 within the mounting bracket 500. The motor 514 may be controlled using the control unit 400 described above in reference to FIG. 4.

The mounting brackets 212, 500 described herein facilitate conversion of a typical wheelchair into a powered wheel chair without modification and using an easy assembly process. The mounting brackets 212, 500 use the existing axle tubes 108A of the wheelchair 102 and provide mounting holes for an axle that is laterally offset from the existing axle tubes 108A.

In some embodiments, certain aspects of the techniques described herein may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as flash memory, a cache, random access memory (RAM), or other non-volatile memory devices, and the like. The executable instructions stored on the non-transitory computer readable storage medium may be in source code, assembly language code, object code, or other instruction format that is interpreted or otherwise executable by one or more processors.

A non-transitory computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A drive apparatus, comprising:
a drive assembly comprising:
a motor; and
a sprocket operatively coupled to the motor, the sprocket defining an engagement hole; and
an engagement assembly, comprising:
an engagement pin; and
an engagement control member configured to insert the engagement pin into the engagement hole of the sprocket in a first position and withdraw the engagement pin from the engagement hole of the sprocket in a second position.

2. The drive apparatus of claim 1, wherein:
the engagement control member comprises a ramp defining an inclined plane;
the engagement pin comprises:
a head contacting the ramp; and
a shaft extending between the engagement control member and the sprocket; and
rotation of the engagement control member changes a positon of the head on the ramp and the extension of the shaft toward the sprocket.

3. The drive apparatus of claim 2, wherein:
the first position comprises a first end of the ramp; and
the second position comprises a second end of the ramp.

4. The drive apparatus of claim 2, wherein:
the engagement control member comprises a wheel; and
the ramp is defined in the wheel.

5. The drive apparatus of claim 1, wherein:
the engagement pin is spring biased in a direction toward the sprocket.

6. The drive apparatus of claim 1, wherein the engagement assembly comprises:
a first wedge mounted to the engagement control member; and
a first retaining plate engaged with the first wedge.

7. The drive apparatus of claim 6, wherein the engagement assembly comprises:
a second wedge aligned with the first wedge;
a second retaining plate over the second wedge; and
a fastener extending through the first retaining plate, the first wedge, the second wedge, and the second retaining plate.

8. The drive apparatus of claim 7, wherein:
the first wedge defines a first notch extending along a side of the first wedge;
the second wedge defines a second notch extending along a side of the second wedge; and
the first notch and the second notch define a channel.

9. The drive apparatus of claim 1, comprising:
a first mounting bracket mounted to the motor;
a second mounting bracket defining a first mounting hole and a second mounting hole;
a first fastener extending from the first mounting bracket to the second mounting bracket through the first mounting hole; and
a second fastener extending from the first mounting bracket to the second mounting bracket through the second mounting hole.

10. The drive apparatus of claim 9, wherein:
at least one of the first fastener or the second fastener comprises a stud attached to the first mounting bracket.

11. The drive apparatus of claim 9, wherein:
a spacing between the first mounting hole and the second mounting hole is about two inches.

12. The drive apparatus of claim 9, wherein the drive assembly comprises:
an axle guide; and
a bearing, comprising:
an outer race engaging the sprocket; and
an inner race engaging the axle guide, wherein:
the axle guide is laterally offset from the first mounting hole and the second mounting hole.

13. The drive apparatus of claim 12, wherein:
the second mounting bracket defines an axle hole aligned with the axle guide.

14. The drive apparatus of claim 13, wherein:
the second mounting bracket defines a third mounting hole; and
the drive apparatus comprises a third fastener extending from the first mounting bracket to the second mounting bracket through the third mounting hole.

15. A wheelchair, comprising:
a wheel comprising an axle;
a frame defining a first axle mount and a second axle mount;
a drive assembly comprising:
a first mounting bracket;
a motor mounted to the first mounting bracket;
a sprocket operatively coupled to the motor, the sprocket defining an engagement hole;
an axle guide laterally offset from the first axle mount and the second axle mount; and
a bearing, comprising:
an outer race engaging the sprocket; and
an inner race engaging the axle guide;
a second mounting bracket defining a first mounting hole aligned with the first axle mount and a second mounting hole aligned with the second axle mount;
a first fastener extending from the first mounting bracket through the first axle mount and through the first mounting hole in the second mounting bracket; and
a second fastener extending from the first mounting bracket through the second axle mount and through the second mounting hole in the second mounting bracket;
an engagement assembly connected to the wheel, the engagement assembly comprising:
an engagement pin; and
an engagement control member configured to insert the engagement pin into the engagement hole of the sprocket in a first position and withdraw the engagement pin from the engagement hole of the sprocket in a second position; and
an axle connecting the wheel to the second mounting bracket through the axle guide.

16. The wheelchair of claim 15, wherein:
the wheel comprises:
a first spoke; and
a second spoke;
the engagement assembly comprises:

a first wedge mounted to the engagement control member and positioned between the first spoke and the second spoke on a first side of the wheel;

a second wedge aligned with the first wedge and positioned between the first spoke and the second spoke on a second side of the wheel;

a retaining plate; and a fastener extending through the first wedge, the second wedge, and the retaining plate to engage the first wedge and the plate.

17. The wheelchair of claim 16, wherein:

the first wedge defines a first notch extending along a side of the first wedge;

the second wedge defines a second notch extending along a side of the second wedge; and the first notch and the second notch define a channel engaging the first spoke.

18. A method for mounting a drive apparatus to a wheelchair, comprising:

providing a drive assembly comprising:

a first mounting bracket;

a first fastener extending from the first mounting bracket;

a motor mounted to the first mounting bracket;

a sprocket operatively coupled to the motor, the sprocket defining an engagement hole;

an axle guide; and a bearing, comprising:

an outer race engaging the sprocket; and an inner race engaging the axle guide;

inserting the first fastener through a first axle mount of a frame of a wheelchair;

attaching a second mounting bracket defining a first mounting hole aligned with the first axle mount and the first fastener to the first mounting bracket using the first fastener;

connecting a second fastener extending from the first mounting bracket through a second axle mount in the frame of the wheelchair and through a second mounting hole in the second mounting bracket;

attaching an engagement assembly to a wheel of the wheelchair, the engagement assembly comprising:

an engagement pin; and an engagement control member configured to insert the engagement pin into the engagement hole of the sprocket in a first position and withdraw the engagement pin from the engagement hole of the sprocket in a second position;

inserting an axle of the wheel through the axle guide; and securing the axle to the second mounting plate.

19. The method of claim 18, wherein attaching the engagement assembly to the wheel comprises:

mounting a first wedge to a first retaining plate;

positioning the first wedge between a first spoke and a second spoke on a first side of the wheel;

positioning a second wedge aligned with the first wedge between the first spoke and the second spoke on a second side of the wheel; and positioning a second retaining plate over the second wedge; and connecting a fastener extending through the first wedge, the second wedge, and the second retaining plate to attach the engagement assembly to the wheel.

20. The method of claim 18, comprising:

moving the engagement control member to engage the engagement pin in the engagement hole of the sprocket in a drive mode of the wheelchair; and moving the engagement control member to disengage the engagement pin in the engagement hole of the sprocket in a freewheeling mode of the wheelchair.

* * * * *